United States Patent
Sondhi et al.

(10) Patent No.: US 10,904,298 B2
(45) Date of Patent: Jan. 26, 2021

(54) MACHINE-LEARNING PROCESSING AT NATIVE-LOCATION STORAGE SYSTEM TO GENERATE COLLECTIONS ACTION PLAN

(71) Applicant: Oracle International Corporation, Redwood Shores, CA (US)

(72) Inventors: Bhupinder Sondhi, Fremont, CA (US); Keshava Mangipudi, Pleasanton, CA (US); Babou Srinivasan, Dublin, CA (US); Madhavi Makkapati, San Ramon, CA (US); Gerhard Schmidt, Mountain House, CA (US); Venugopal Bheemreddy, Karnataka (IN); Balaji Dasarath, Karnataka (IN); Christopher Bharath, Karnataka (IN); Tripti Nair, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/586,365

(22) Filed: Sep. 27, 2019

(65) Prior Publication Data
US 2020/0128051 A1 Apr. 23, 2020

Related U.S. Application Data

(60) Provisional application No. 62/748,149, filed on Oct. 19, 2018.

(51) Int. Cl.
*H04L 29/06* (2006.01)
*H04L 12/58* (2006.01)
(Continued)

(52) U.S. Cl.
CPC ......... *H04L 65/1059* (2013.01); *G06N 20/00* (2019.01); *H04L 29/08135* (2013.01);
(Continued)

(58) Field of Classification Search
CPC .......... H04L 29/08135–08171; H04L 29/08261–08288; H04L 41/08–0803;
(Continued)

(56) References Cited

U.S. PATENT DOCUMENTS 7,305,345 B2 12/2007 Bares et al.
7,392,162 B1 6/2008 Srinivasan et al.
(Continued)

FOREIGN PATENT DOCUMENTS

| CN | 105631707 | 6/2016 |
|---|---|---|
| WO | 2006132759 | 12/2006 |
| WO | 2017147785 | 9/2017 |

OTHER PUBLICATIONS

U.S. Appl. No. 16/007,787, Non-Final Office Action dated Feb. 5, 2020, 11 pages.
(Continued)

*Primary Examiner* — Brendan Y Higa
(74) *Attorney, Agent, or Firm* — Kilpatrick Townsend & Stockton LLP

(57) ABSTRACT

Techniques are disclosed for using machine-learning processing for generating resource-allocation specifications. A first data set may be received from a first data source. The first data set can include a first resource request and a first timestamp associated with entities. A second data set can be received from a second data source that includes communication data and allocation data associated with the entities. Target characteristics may be defined for training instances. The training instances can be used to train a machine-learning model using the first data set and the second data set. A third data set may be accessed and used to generate a user session within which, the trained machine-learning model may execute to generate a resource-allocation specification. The resource-allocation specification including a
(Continued)

communication schedule. One or more communications compliant with the communication schedule may be output to an entity.

20 Claims, 5 Drawing Sheets

(51) Int. Cl.
  *G06N 20/00* (2019.01)
  *H04L 12/24* (2006.01)
  *H04L 29/08* (2006.01)
(52) U.S. Cl.
  CPC .......... *H04L 41/08* (2013.01); *H04L 41/0823* (2013.01); *H04L 41/14* (2013.01); *H04L 41/16* (2013.01); *H04L 41/5051* (2013.01); *H04L 41/5096* (2013.01); *H04L 51/34* (2013.01); *H04L 67/10* (2013.01)
(58) Field of Classification Search
  CPC . H04L 41/0823–0836; H04L 41/14–16; H04L 41/5041–5054; H04L 41/5096; H04L 67/10–1008; H04L 67/1025–1029; H04L 67/1036
  See application file for complete search history.

(56) References Cited

U.S. PATENT DOCUMENTS

| | | | |
|---|---|---|---|
| 8,321,371 | B2 | 11/2012 | Bridges et al. |
| 9,665,641 | B1 | 5/2017 | Zhang |
| 9,674,154 | B1 | 6/2017 | Canavor et al. |
| 9,785,715 | B1 | 10/2017 | Busey et al. |
| 10,089,983 | B1 | 10/2018 | Gella et al. |
| 10,129,157 | B2 * | 11/2018 | Fan .................. H04L 47/20 |
| 10,423,628 | B2 | 9/2019 | Bolcer et al. |
| 2006/0026203 | A1 | 2/2006 | Tan et al. |
| 2009/0058859 | A1 | 3/2009 | Crawford et al. |
| 2011/0055098 | A1 | 3/2011 | Stewart |
| 2012/0150626 | A1 | 6/2012 | Zhang et al. |
| 2012/0303790 | A1 * | 11/2012 | Singh .................. H04L 43/0811 709/224 |
| 2013/0346886 | A1 | 12/2013 | Cauchois et al. |
| 2014/0089495 | A1 * | 3/2014 | Akolkar ................ H04L 41/147 709/224 |
| 2014/0122355 | A1 | 5/2014 | Hardtke et al. |
| 2014/0358828 | A1 | 12/2014 | Phillipps et al. |
| 2014/0365358 | A1 | 12/2014 | Higaki et al. |
| 2015/0006294 | A1 | 1/2015 | Irmak et al. |
| 2015/0161566 | A1 | 6/2015 | Cai |
| 2016/0004705 | A1 | 1/2016 | Petrocik et al. |
| 2016/0132800 | A1 | 5/2016 | Davar et al. |
| 2016/0328715 | A1 | 11/2016 | Gideoni et al. |
| 2016/0350406 | A1 | 12/2016 | Byron et al. |
| 2016/0358240 | A1 | 12/2016 | Redfern et al. |
| 2017/0006342 | A1 | 1/2017 | Nagaraja Rao et al. |
| 2017/0061382 | A1 | 3/2017 | Zhang et al. |
| 2017/0061472 | A1 | 3/2017 | Mathis |
| 2017/0193451 | A1 | 7/2017 | Fang |
| 2017/0193452 | A1 | 7/2017 | Wang et al. |
| 2017/0344556 | A1 | 11/2017 | Wu et al. |
| 2018/0060749 | A1 | 3/2018 | Yan et al. |
| 2018/0084078 | A1 | 3/2018 | Yan |
| 2018/0225714 | A1 | 8/2018 | Lewis et al. |
| 2018/0232592 | A1 | 8/2018 | Stewart et al. |
| 2018/0302335 | A1 * | 10/2018 | Gao .................... H04L 43/0876 |
| 2018/0308124 | A1 | 10/2018 | Gao et al. |
| 2019/0050427 | A1 | 2/2019 | Wiesel et al. |
| 2019/0190798 | A1 * | 6/2019 | Asthana ................ G06F 9/5077 |
| 2019/0245757 | A1 * | 8/2019 | Meyer ................. G06F 9/45558 |

OTHER PUBLICATIONS

International Application No. PCT/US2018/051421, International Preliminary Report on Patentability dated Apr. 9, 2020, 9 pages.
International Application No. PCT/US2018/051422, International Preliminary Report on Patentability dated Apr. 9, 2020, 6 pages.
"AI for Recruiting: A Definitive Guide for HR Professionals", ideal, Available online at: https://ideal.com/ai-recruiting/, Jan. 31, 2018, 11 pages.
Eve, "Best Practices: Answer Bot Customer Service for Agents", Zendesk Support, Available online at: https://goo.gl/ntteca, Accessed from Internet at Feb. 1, 2018, 3 pages.
Faliagka et al., "Application of Machine Learning Algorithms to an Online Recruitment System", ICIW 2012: The Seventh International Conference on Internet and Web Applications and Services, Available online at: http://citeseerx.ist.psu.edu/viewdoc/download?doi=10.1.1.885.909&rep=rep1&type=pdf, Jan. 2012, pp. 215-220.
Huang et al., "Extracting Chatbot Knowledge from Online Discussion Forums", Available online at: https://www.aaai.org/Papers/IJCAI/2007/IJCAI07-066.pdf, Jan. 2007, pp. 423-428.
Mortimer; Mike, "Introducing Answer Bot-Automatic Article Suggestions for Better Self-Service Support", Zendesk Support, Available online at: https://goo.gl/LYcMBu, Aug. 2017, 5 pages.
O'Neill; Heather, "How Vector Space Matching Technology is One-Upping the ATS Ability to Unearth Your Top Applicants", Available online at: https://www.mightyrecruiter.com/blog/author/heather/, Feb. 15, 2017, 3 pages.
Pleasant; Robbie, "Zendesk Adds Answer Bot to Zendesk Guide-Unified Communications Strategies", Available online at: www.ucstrategies.com/unified-communications-newsroom/zendeck-adds-answer-bot-to-zendesk-guide.aspx, Aug. 22, 2017, 2 pages.
Spanier; Aimee, "Working with Answer Bot (for Agents)", Zendesk Support, Available online at: https://support.zendesk.com/hc/en-us/articles/115010243928, Jul. 2017, 6 pages.
Zendesk, "Guide: Zendesk's New Solution That Uses Machine Learning to Resolve Customer Queries", Available online at: https://techseen.com/2017/05/04/zendesk-guide-machine-learning/, May 4, 2017, 5 pages.
Zendesk, "Tech Specs—What Zendesk is Made of", Available online at: https://www.zendesk.co.uk/product/tech-specs/, Accessed from Internet at Feb. 1, 2018, 14 pages.
Zendesk, "Virtual Customer Assistant-Answer Bot", Answer Bot Zendesk, Available online at: https://www.zendesk.com/answer-bot/, Accessed from Internet at Jan. 30, 2018, 7 pages.
Zimmermann et al., "Data-Driven HR Resume Analysis Based on Natural Language Processing and Machine Learning", Available online at: https://arxiv.org/pdf/1606.05611.pdf, Jun. 21, 2016, 6 pages.
International Application No. PCT/US2018/051421, International Search Report and Written Opinion dated Jan. 7, 2019, 13 pages.
International Application No. PCT/US2018/051422, International Search Report and Written Opinion dated Jan. 4, 2019, 10 pages.

* cited by examiner

MACHINE-LEARNING PROCESSING AT NATIVE-LOCATION STORAGE SYSTEM TO GENERATE COLLECTIONS ACTION PLAN

CROSS-REFERENCE TO RELATED APPLICATIONS

This application is a non-provisional of and claims the benefit and priority under 35 U.S.C. 119(e) of U.S. Provisional Application No. 62/748,149, filed Oct. 19, 2018, entitled "Machine-Learning Processing At Native-Location Storage System To Generate Collections Action Plan", the entire contents of which are incorporated herein by reference for all purposes.

TECHNICAL FIELD

This disclosure generally relates to systems and methods of generating resource-allocations procedures, and more specifically to machine-learning processing native location storage systems that generate resource-allocation processes.

BACKGROUND

In some environments, a first entity may generate resource-allocation requests to obtain resources for products transmitted to a second entity or services rendered to the second entity. Frequently, the second entity fails to satisfy the request by failing to allocate the requested resources or allocating fewer resources than requested. The first entity may wait for a timeout event (e.g., an interval of time after transmitting the resource request) before indicating that the resource request failed. Yet, the first entity can do little more than generate a subsequent request with little likelihood that the second entity will satisfy the subsequent resource allocation request. When insufficient resources are allocated to the first entity, processing at the first entity may begin to slow or halt thereby preventing the first entity from operating appropriately.

SUMMARY

Some aspects of the present disclosure include methods for machine-learning processing at native-location storage system resource allocation requests. The methods include receiving a first data set that includes a first resource request for each of a first set of client devices, each first resource request including a first timestamp and a first resource manifest that indicates an amount of resources to be allocated. A second data set may be received from second data sources that indicates, for each client device of the of the first set of client devices: communications data that characterizes one or more communications transmitted to the client device, each communication of the one or more communications being associated with an allocation of resources corresponding to a resource request, wherein the communications data includes, for each communication of the one or more communications: a communication type; a communication protocol used to transmit the communication; a timestamp; and content of the communication; and allocation data that indicates whether the resource request was satisfied by the client device and an amount of resources allocated if the resource request was satisfied.

For each of one or more training instances, one or more target characteristics from a plurality of available target characteristics can be defined. The one or more target characteristics for a particular training instance are different than the one or more target characteristics of other training instances. A machine-learning model can be trained within a training instance using the first data set and the second data set. A set of parameters may be learned as a result of the training. A third data set that includes, for each client device of a second set of client devices, a second resource request can be accessed. Each second resource request can include a second timestamp and a second resource manifest.

The machine-learning model can be executed on the third data set to generate a resource-allocation specification that can includes, for each of at least one of the second set of client devices, a revised second resource request that includes a communication schedule and a third resource manifest, the third resource manifest being different from the second resource manifest. One or more communications compliant with the communication schedule of the revised second resource request may then be output.

Some aspects of the present disclosure include a system comprising one or more processors and a non-transitory computer-readable media that includes instructions that when executed by the one or more processors, cause the one or more processors to perform part or all of one or more methods disclosed herein.

Some aspects of the present disclosure include a non-transitory computer-readable media that includes instructions that when executed by one or more processors, cause the one or more processors to perform part or all of one or more methods disclosed herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
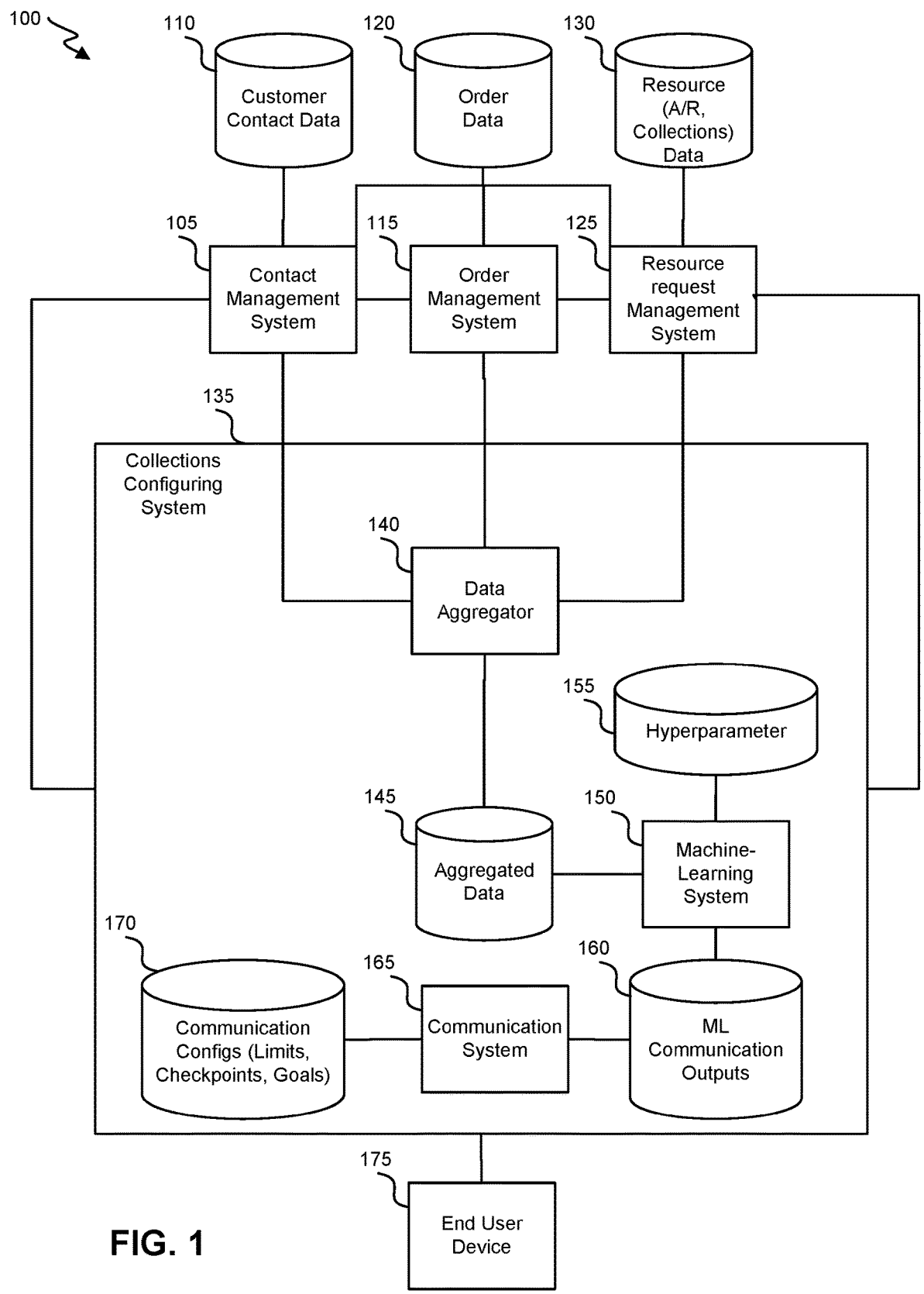
FIG. 1 illustrates a simplified block diagram of an collection system for processing distributed data using a machine-learning model to generate allocation outputs according to at least one aspect of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

In various contexts, a first entity may issue a resource allocation request in response provisioning services and/or products to one or more second entities. Frequently, this exchange is not concurrent, in that the services and/or products are provided to a second entity before or after resources are allocated to the first entity. The first entity may transmit a resource request to the second entity that identifies an amount of the resource and a timestamp (e.g., date and/or time) by which the resource allocation is requested. However, second entities do not always reliably and promptly respond to such resource requests and/or authorize resource allocations. The first entity may attempt to promote an allocation of resource via (for example) follow-up communications, incentives for providing timely resource allocation, etc., but such efforts often involve a processing and/or time cost to the first entity.

In some instances, techniques are disclosed for using machine-learning models to improve resource allocation between first entities and second entities. The machine-learning model can be configured to receive, as input, a data set for each of the second entities. The data set can model a historical relationship between the first entity and the second entity (e.g., processing services provided by the first entity to the second entity, resource-allocation requests transmitted by the first entity and satisfied by the second entity, etc.). The machine-learning model can process the data set to generate an output resource-allocation specification that can be executed by the first entity to improve the allocation of resources by a second entity after the second entity failed to respond to an initial resource-allocation request or failed to allocate a threshold amount of resources. For instance, the resource-allocation specification can include a set of communication protocols that can be used to transmit alternate versions of the resource-allocation request to the second entity. The resource-allocation specification, once execute may, increase the likelihood that the second entity may allocate the requested resources and/or increase the an amount of resources allocated.

As one particular example, the machine-learning model may receive input that includes various data pertaining to a set of entities each subject to resource allocation requests by a first entity. The machine-learning model can generate output that separates the set of entities into three clusters, where a subsequent resource allocation request may be transmitted over a first communication protocol to each entity in the first cluster; where a subsequent resource allocation request may be transmitted over a second communication protocol to each entity in the second cluster; and where no subsequent resource allocation request may be transmitted to any entity in the third cluster. Each cluster may be further divided to indicate whether a reduction in the resources requested may be included provided the resource allocation is received by an identified interval (and/or that indicates a size of such reduction).

In some instances, the output, a resource-allocation specification, may be presented to an end user via an interface. One or more inputs can be received that indicate a modification to a resource-allocation specification including, but not limited to, which entities are assigned to particular clusters, definition of communications, communication protocols over which communications are to be transmitted for particular clusters, and/or the like. For example, an input can indicate that entity #3 is to be moved from Cluster #2 (corresponding to an email follow-up) to Cluster #1 (corresponding to a call follow-up). The interface may further include an element that receives input corresponding to approval of the represented resource-allocation specification. Upon receiving the approval, in some instances, one or more communications are automatically generated and/or transmitted. In some instances, the one or more communications can be conditioned upon receiving an input from an end user corresponding to a request to facilitate such communications. For example, communications over a first communication protocol, such as email, can be generated and transmitted for each entity in a given cluster. As another example, a data record identifying one or more communication protocols that can be used to transmit communications to an entity can be generated for each entity in a second cluster. Each data record can be transmitted to a collector that may transmit communications over at least one of the one or more communication protocols identified in the data record.

The resource-allocation specification that may be output from the machine-learning model may be executed by the first entity (or an independent entity) to improve resource allocations for one or more sets of second entities (e.g., entities that correspond to the one or more clusters). For instance, resource-allocation specification may define communications for transmission to a second entity over one or more protocols that can result in an improved resource allocation (e.g., the second entity will satisfy the resource-allocation request and/or the resources allocated will be closer or equal to the amount of resources requested). In some instances, the resource-allocation specification may include a communication schedule that indicates a particular time interval over which particular communications should be transmitted over a particular communication protocol.

Resource-allocation specifications may be executed automatically (e.g., without human intervention) to generate and transmit the communications to the second entity over the one or more communication protocol. In some instances, the resource-allocation specification may include templates that, with external code, may be used to generate communications. The resource-allocation specification can be embedded in or execute from a database (e.g., in-database) where the data within the database may be used to populate aspects of the templates. In other instances, the resource-allocation specification may be a self-contained package that includes embedded code (e.g., added by the machine-learning model or another application) that may execute to generate and transmit communications over at least one communication protocol according to the communication schedule.

FIG. 1 illustrates a simplified block diagram of an allocation system 100 for processing distributed data using a machine-learning model to generate allocation outputs according to at least one aspect of the disclosure. Various components of allocation system 100 can communicate over one or more networks, including wired or wireless networks. Examples of networks include, but are not limited to the Internet, a local-area networks, a wide-area networks, peer-to-peer networks, combinations thereof, and the like. Allocation system 100 can include one or more management systems configured to control storage at, access to, and/or retrieval of data from one or more databases. For instance, contact management system 105 may control access to client contact database 110. Client contact database 110 can store, for each of a set of entities, contact information that includes (for example) a name of the entity (e.g., device identifier, a name of a corporate entity, or the like), one or more physical addresses of the entity (e.g., such as a street address), one or more email addresses associated with the entity, one or more contacts associated with the entity, or the like).

Order management system 115 controls an order database 120. Order database can include data characterizing each of one or more entity's service order. For example, Order data can indicate a date of an order, an identifier of an entity that generated the order, one or more products and/or services being ordered, per-item and/or total value of the products and/or services being ordered, one or more customizations requested to the order, a requested or indicated delivery date and/or an indicated resource allocation deadline.

Resource request management system 125 controls a resource request database 130. Resource request database 130 can include data characterizing generated and/or transmitted resource requests, generated and/or transmitted follow-ups on resource requests, accounts-receivable information and/or collection information. The data can be stored in association with an identifier of an entity. For instance, for a given entity, the resource request data can identify—for each of multiple resource requests—the order(s) represented in the resource request, whether any discount had been applied (e.g., and, if so, the amount or percentage of the discount), a resource allocation deadline indicated on the resource request, whether any potential benefit or penalty (conditioned on timing and/or amount of payment) was identified on the resource request, a date on which the resource request was transmitted, a communication protocol by which the resource request was transmitted, one or more dates on which any follow-ups were transmitted, one or more communication protocols by which any follow-ups were transmitted, an identifier of the entity corresponding, whether the resources were allocated, one or more dates on which the entity allocated the resources according to the resource request, and/or an amount of any corresponding resource allocation. By identifying the corresponding order, order data can be identified via order management system 115.

A collections configuring system 135 can include a data aggregator 140 that can aggregate data across the databases. The data can be aggregated by identifying mapping various data elements from different databases to a single entity and/or single order. For instance, the aggregated data can include multiple data records, each of which can identify characteristics of each of: an entity, an order, one or more invoicing (and/or follow-up) actions and/or a resource allocation (e.g., via provision of credit-card information, a check or wire information). In some instances, data aggregator may aggregate the data in-database such that data aggregator may be positioned within aggregated data database 145. In some instances, aggregated data database 145 may include a search engine such as a near real-time search engine or the like. An example of a near real-time search engine includes elasticsearch.

In some instances, the aggregated data can be stored in an aggregated database 145, which can be accessed by a machine-learning system 150 (e.g., which can include and/or be a routine, program, or code). In some instances, the aggregated may be directly fed to machine-learning system 150. In some instances, machine-learning system 150 can use the aggregated data to train, validate, or test a machine-learning model. Training the model can include defining a set of parameters that are used to transform input data (e.g., representing an order, entity, historical resource allocation, etc.) to output data (e.g., representing characteristics of a resource request, transmitting a resource request, a follow-up, transmitting a follow-up, etc.). The training may be performed to optimize one or more other variables (e.g., collection amounts and/or collection speed).

The machine-learning model can be trained on data that includes—for each of one or more entities—input data and output data that indicates (for example) whether the entity allocated resources (e.g., payment), a timestamp indicating when the resources were allocated, an amount of the resource allocation, and/or subsequent pro activity. The model can be trained to improve resource allocations, the timing of subsequent resource allocations (e.g., within a predefined time interval from a resource request or follow-up or generally preferring earlier resource allocation to later resource allocation), full allocation of the requested resource, and/or retaining an entity (e.g., as indicated by one or more subsequent orders). Training the model can have an effect of setting the value of one or more parameters. The one or more parameters can include one or more weights, which can be used to transform a particular input data set (representing one or more particular entities and/or one or more particular resource requests) into a particular output data set.

The machine-learning model can include a supervised learning algorithm, a semi-supervised learning algorithm, or an unsupervised learning algorithm. For example, with respect to the supervised learning algorithm, the model may be trained using labeled data. For instance, the model may be trained by processing input data (e.g., of one or more types described herein) that is labeled with action data that is of a type that is output by the model but that indicates (for example) characteristics of collection actions actually used. As another example, with respect to an unsupervised learning algorithm, the model may be trained using data sets that include input data (e.g., of one or more types described herein), allocation-action characteristics used, and resource-allocation characteristics (e.g., indicating per-entity or across-entity indications as to whether resources were allocated (e.g., received by the first entity), an amount of one or more resources allocated, and/or timeliness of one or more resource allocations).

In some instances, execution and/or training of the machine-learning model is performed within a data-management system (e.g., Oracle® PeopleSoft®) and/or within a database. In some instances, execution and/or training of the machine-learning model is performed locally within a database or data store (e.g., in-database). For example, the data-management system and/or database can include custom code, such that the machine-learning model is trained and/or executed at a data-stack layer that is on top of the data itself.

Such local execution can restrict the data exported from the database or data store and improve data privacy and security. Further, the local execution can improve the speed at which processing is performed. For example, upon storage of a new order, resource request, or entity data, a local script may immediately detect the new data, generate input data for the machine-learning model and execute the machine-learning model. In some instances, a data-management system can operate in a parallel server mode while executing and/or training the machine-learning model. Thus, the database can be used (for example) to process queries and searches, while it is also used to train the machine-learning model and/or to process the database's data via the machine-learning model.

In some instances, execution and/or training of the machine-learning model is performed remote to the data-management system and/or database, such that the data-management system transmits input system to the remote system to be processed by the machine-learning model and receives results. In some instances, a user can select whether to use a remote or local iteration.

Training of the machine-learning model can occur at a central location, and the trained model can then be distributed to a system of a client, such that the model can process data controlled by and/or stored at the client. In some instances, the model can be further configured at the client system.

For example, client input can identify a selection of a type of algorithm to be used (e.g., a clustering algorithm, a classification algorithm, a regression algorithm, decision tree, naive bayes, support vector machines, Bayesian approach, etc.). As another example, client input can identify a selection of one or more limits. A limit may restrict (e.g., within a particular time period or single data set) a number of entities for which a certain communication protocol is to be used, a specific reduction is to be applied and/or an installment plan is to be offered. A limit may alternatively or additionally identify a lower or upper threshold by which a follow-up is to be transmitted for a resource request.

As yet another example, client input can identify one or more checkpoints at which an automated action is to be conditioned upon receiving user input authorizing the action. To illustrate, the client input may indicate that if the model recommends applying any reduction above a threshold amount, such recommendation is to be presented or transmitted to a user. If input from the user authorizes the reduction, it may be applied to the resource request, while otherwise, it may not be applied. Meanwhile, reductions below the threshold may be approved for automatic implementation.

As still another example, client input can identify one or more goals. A goal can include (for example) collecting at least a threshold dollar amount of resource allocations (e.g., within a given time period, per a given number of resource requests, per a given number of accounts receivable, etc.), collecting resources for at least a threshold number of percentage of resource requests (e.g., invoices, bills, etc.) collecting at least a threshold percentage of the amounts due for a set of resource requests, achieving an average duration between an resource request date and payment date that is below a specified percentage, etc. The goal(s) can be used (for example) to further train the model and/or to select upon multiple available parameter sets.

At yet another example, client input can identify one or more data sources that provide data to be used (e.g., in its initial form or subsequent to pre-processing) as input to (or for training data for) the machine-learning model. Additionally, specifications as to how to use output of the model can be specified (e.g., where and how to save the data or to which system component to avail the data). Thus, the client input can indicate how data is fed to and/or fed from the machine-learning model.

The model can be configured with a set of hyperparameters, which can be stored in a hyperparameter data store 155. Hyperparameters may be defined by a user of a local or central system. Exemplary hyperparameters include a number of layers, threshold on cluster quantities, a learning rate, or the like.

The model can generate one or more outputs, which can correspond to individual entities, individual resource requests, individual clusters of client devices (and/or resource requests) and/or all entities (and/or resource requests) represented in an input data set. The output(s) can include one or more communication recommendations that indicate (for example) when to transmit a resource request; a protocol to transmit a resource request; a discount (or discount structure) to apply; whether to apply a discount; whether, when and/or through which communication protocol to transit a follow-up to an resource request; etc. In some instances, the output(s) identify a cluster assignment for each entity and/or for each resource request, where each cluster corresponds to one or more communication characteristics. The output(s) can be stored (e.g., in association with an identifier of an entity and/or resource request) in a machine-learning communication output data store 160.

In some instances, collections configuring system 135 can include a communication system 165 that can generate (and, in some instances, transmit) one or more communications to entities based on the communication output(s). For example, a generated communication can include an email (or letter document) that identifies an amount of resources requested, a resource allocation deadline, any applied discount, etc. As another example, a generated communication can include a data record that includes details to be conveyed by a collector during a follow-up to an entity pertaining to a resource request. As yet another example, a generated communication can include an audio signal for a robocall to follow-up on a resource request and offer a discount conditioned on resource allocation within a particular time period. Communication system 165 may be configured to (for example) send emails, make robocalls, send faxes, prepare letters, send text messages, etc. Communication system 165 can retrieve contact information for a cluster by sending a query to contact management system 105. Communication system 165 can also report communications to resource request management system 125, such that resource database 130 can be appropriately updated. Resource request management system 125 may then store an indication as to which communications were transmitted in accordance with machine-learning outputs (instead of a static rule or manual selection). Such indications can facilitate subsequent training of the model.

A communication configurations database 170 can store a set of communication configurations. The configurations can affect communication generation, communication transmission, training of the machine-learning model and/or execution of the machine-learning model. The configurations may have been identified in one or more communications received from end user device 175.

In some instances, communication system 165 can transmit an identification of one or more outputs generated by machine learning system 150 to end user device 175 and/or transmits an indication of a proposed communication plan. End user device 175 may modify, approve or reject a particular communication characteristic, a communication in its entirety, an assignment of an entity or resource request to a cluster, the proposed communication etc. Such modifications, approvals and/or rejections can be used as feedback to further train the model.

While multiple systems are represented in FIG. 1, in some instances, a single computer system and/or single device can include two, more or all of the depicted systems. For example, in one instance, machine-learning system 150, contact management system 105, order management system 115 and billing management system 125 all operate at a layer above the data itself (entity contact data, order data and resource request data) within a database (e.g., in-database processing). In some instances, collections configuring system 135 can be included within a computing system that that may be physically remote from each of contact management system 105, order management system 115 and resource request management system 125. In some instances, collections configuring system 135 can be physically separate from but connected via a wired connection or local wireless connection (e.g., via WiFi or near-field communication) to each of contact management system 105, order management system 115 and resource request management system 125.

Various implementations and configurations of artificial intelligence are disclosed in U.S. application Ser. No. 16/007,677, filed on Jun. 13, 2018; Ser. No. 16/007,762, filed on Jun. 13, 2018; Ser. No. 16/007,787, filed on Jun. 13, 2018; and Ser. No. 16/146,678, filed on Sep. 28, 2018. Each of these applications is hereby incorporated by reference in its entirety for all purposes.

Figure 2:
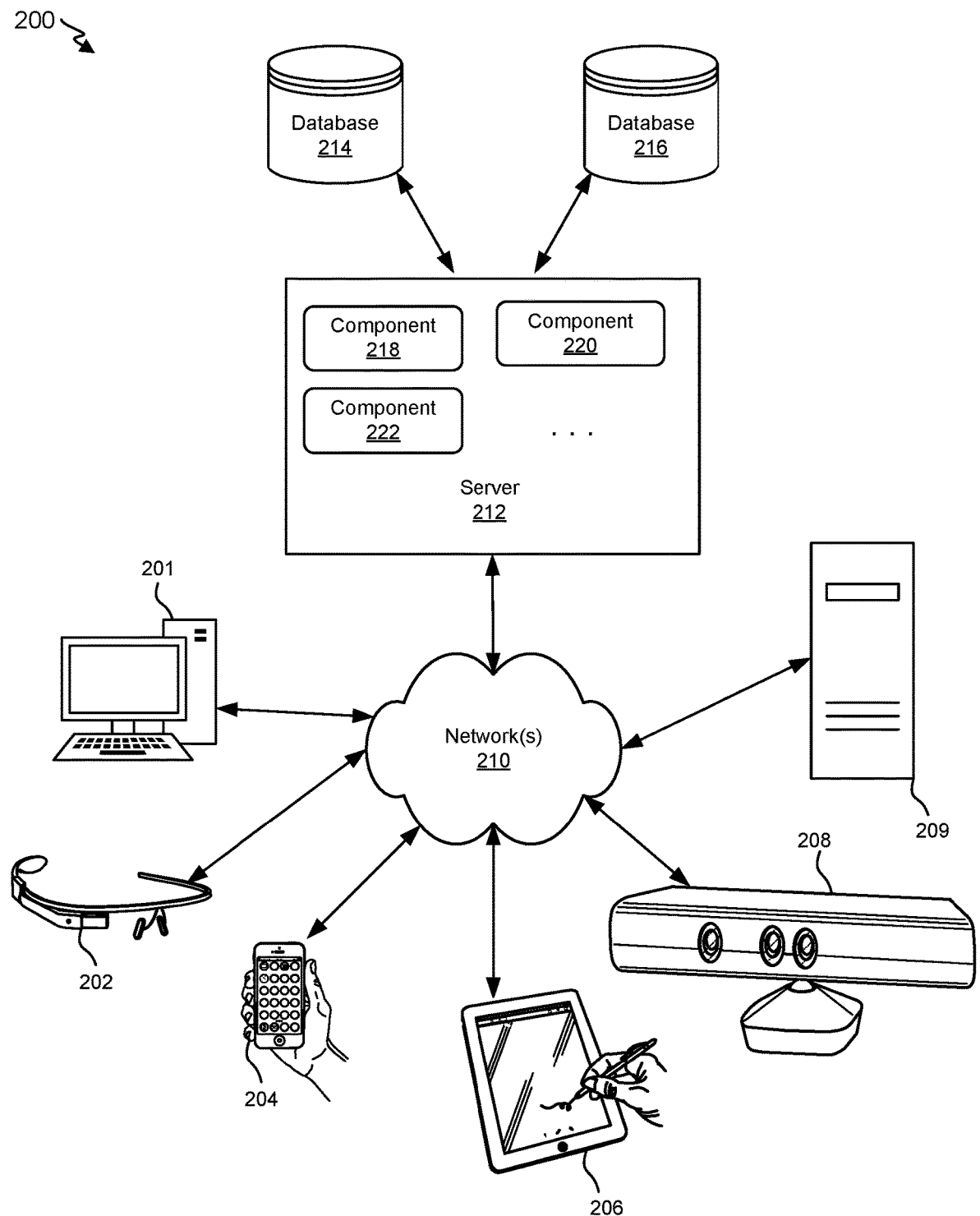
FIG. 2 illustrates a simplified diagram of a distributed system 200 according to at least one aspect of the disclosure.

FIG. 2 illustrates a simplified diagram of a distributed system 200 according to at least one aspect of the disclosure. Distributed system 200 may include one or more client computing devices such as client computing devices 201, 202, 204, 206, 208, and 209, which may be configured to execute and operate one or more client applications such as a web browser, proprietary client (e.g., Oracle Forms), or the like over one or more network(s) 210. Server 212 may be communicatively coupled with remote client computing devices via network 210.

Server 212 may be adapted to execute one or more services or software applications provided by one or more of the components of the system. In some instances, these services may be offered as web-based or cloud services or under a Software as a Service (SaaS) model to the users of client computing devices 201, 202, 204, 206, 208, and/or 209. Users operating client computing devices 201, 202, 204, 206, 208, and/or 209 may in turn utilize one or more client applications to interact with server 212 to utilize the services provided by these components.

Software components 218, 220 and 222 of system 200 may be implemented by server 212. In other instances, one or more of software components 218, 220 and 222 of system 200 and/or the services provided by these components may also be implemented by one or more of the client computing devices 201, 202, 204, 206, 208, and/or 209. Users operating the client computing devices may then utilize one or more client applications to use the services provided by these components. These components may be implemented in hardware, firmware, software, or combinations thereof. It should be appreciated that various different system configurations are possible, which may be different from distributed system 200. System 100 may be just one example of a distributed system and is not intended to be limiting.

Client computing devices 201, 202, 204, 206, 208, and/or 209 may be portable handheld devices (e.g., an iPhone®, cellular telephone, an iPad®, computing tablet, or a personal digital assistant (PDA)), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose servers or general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 202, 204, 206, and 208 may be any other electronic device, such as a thin-client computer, a personal messaging device, capable of communicating over network(s) 210, servers, and/or persistent storage devices, such as databases.

Although distributed system 200 is shown is depicted with six client computing devices, any number of client computing devices may be supported. Other devices, such as devices with sensors, etc., may interact with server 212.

Network(s) 210 in distributed system 200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 210 can be a local area network (LAN), such as one based on Ethernet, Token-Ring and/or the like. Network(s) 210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 212 may be adapted to run one or more services or software applications described in the foregoing disclosure. For example, server 212 may correspond to a server for performing processing described above according to aspects of the present disclosure.

Server 212 may run an operating system including any of those discussed above, as well as any commercially available server operating system. Server 212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some instances, server 212 may include one or more applications to analyze and consolidate data feeds and/or event updates received from users of client computing devices 202, 204, 206, and 208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 212 may also include one or more applications to display the data feeds and/or real-time events via one or more display devices of client computing devices 201, 202, 204, 206, 208, and/or 209.

Distributed system 200 may also include one or more databases 214 and 216. Databases 214 and 216 may reside in a variety of locations. By way of example, one or more of databases 214 and 216 may reside on a non-transitory storage medium local to (and/or resident in) server 212.

Alternatively, databases 214 and 216 may be remote from server 212 and in communication with server 212 via a network-based or dedicated connection. In some instances, databases 214 and 216 may reside in a storage-area network (SAN). Similarly, any necessary files for performing the functions attributed to server 212 may be stored locally on server 212 and/or remotely, as appropriate. In some instances, databases 214 and 216 may include relational databases, such as databases provided by Oracle, that are adapted to store, update, and retrieve data in response to SQL-formatted commands.

Figure 3:
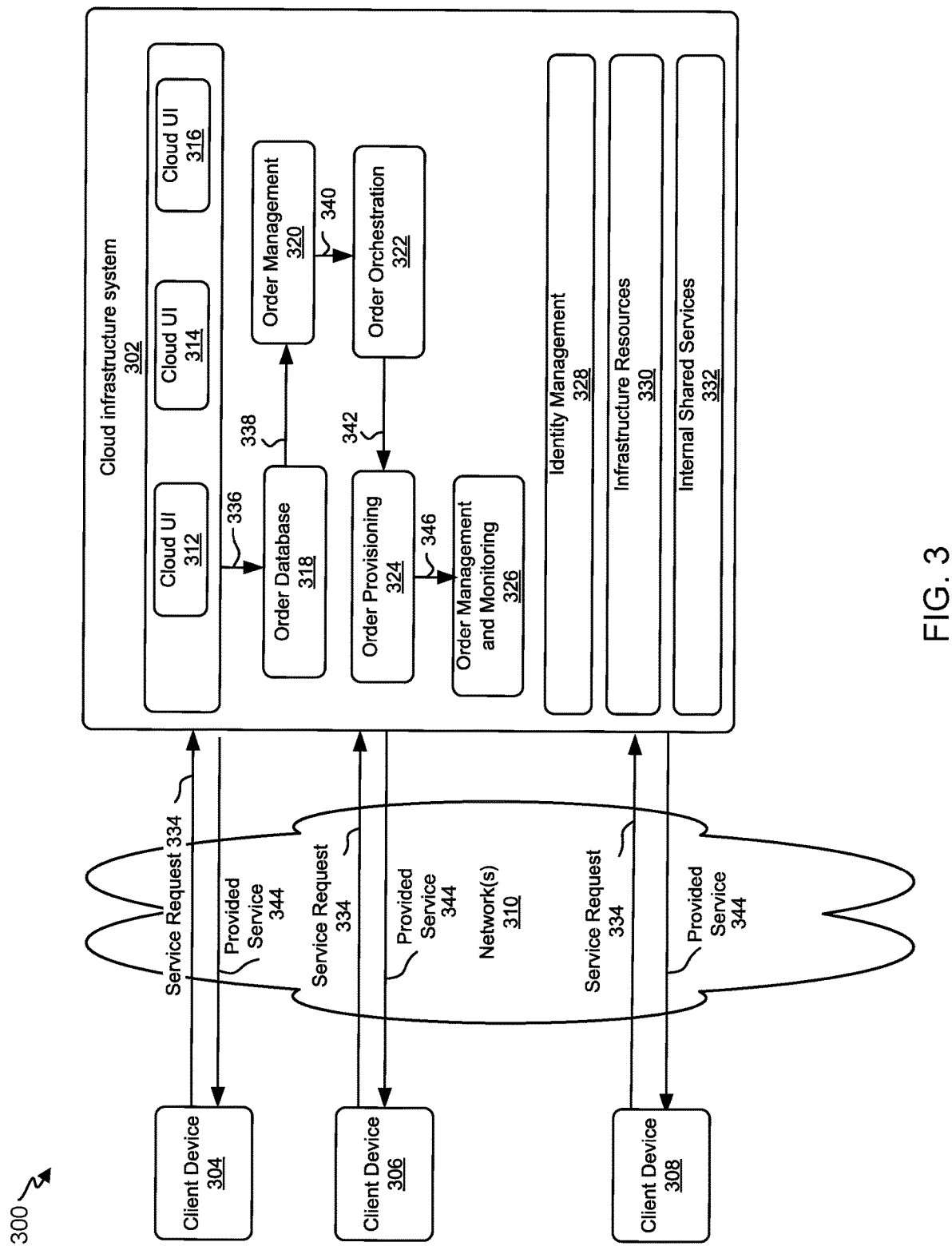
FIG. 3 illustrates a simplified block diagram of one or more components of a system environment by which services provided by one or more components may be offered as cloud services, according to at least one aspect of the disclosure.

FIG. 3 illustrates a simplified block diagram of one or more components of a system environment 300 by which services provided by one or more components may be offered as cloud services, according to at least one aspect of the disclosure. System environment 300 may include one or more client computing devices 304, 306, and 308 that may be used by users to interact with a cloud infrastructure system 302 that provides cloud services. The client computing devices may be configured to operate one or more client applications such as a web browser, a proprietary client application (e.g., Oracle Forms), or other applications, which may be used by users of client computing devices to interact with cloud infrastructure system 302 to use services provided by cloud infrastructure system 302.

Cloud infrastructure system 302 may include the components depicted as well as one more other components (not shown). The particular components and configuration shown in FIG. 3 may be only one example of a cloud infrastructure system that may incorporate aspects of the present disclosure. In some other aspects, cloud infrastructure system 302 may have more or fewer components, may combine two or more components into a single component, or may have a different configuration or arrangement of components.

Client computing devices 304, 306, and 308 may be computing devices that are similar to or the same as the one or more client computing device 201, 202, 204, 206, 208, 209 of FIG. 2.

Although exemplary system environment 300 is shown with three client computing devices, any number of client computing devices may be supported. Other devices such as devices with sensors, etc. may interact with cloud infrastructure system 302.

Network(s) 310 may facilitate communications and exchange of data between clients 304, 306, and 308 and cloud infrastructure system 302. Each network may be any type of network familiar to those skilled in the art that can support data communications using any of a variety of commercially-available protocols, including those described above for network(s) 210 of FIG. 2.

Cloud infrastructure system 302 may comprise one or more computers and/or servers that may include those described above for server 212 of FIG. 2.

In certain instances, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. For instance, multiple users may request a particular service from the cloud infrastructure system causing the cloud infrastructure system to allocate additional processing resources (e.g., from one or more devices of the cloud infrastructure system) to enable the cloud infrastructure system to provide the service to each of the multiple users. A specific instantiation of a service provided by cloud infrastructure system may be referred to herein as a "service instance." In general, any service made available to a user via a communication network, such as the Internet, from a cloud service provider's system may be referred to as a "cloud service." In a public cloud environment, servers and systems that make up the cloud service provider's system may be different from the client device's own on-premises servers and systems. For example, a cloud service provider's system may host an application, and a user may, via a communication network such as the Internet, on demand, order and use the application. For instance, cloud service provider's system may host the application as a web service, as a SaaS, or the like.

In some instances, a service in a service provided by cloud infrastructure system may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In some instances, cloud infrastructure system 302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 302 may be adapted to automatically provision, manage and track a customer's subscription to services offered by cloud infrastructure system 302. Cloud infrastructure system 302 may provide the cloud services via different deployment models. For example, services may be provided under a public cloud model in which cloud infrastructure system 302 is owned by an organization selling cloud services (e.g., owned by Oracle) and the services are made available to the general public or different industry enterprises. As another example, services may be provided under a private cloud model in which cloud infrastructure system 302 is operated solely for a single organization and may provide services for one or more entities within the organization. The cloud services may also be provided under a community cloud model in which cloud infrastructure system 302 and the services provided by cloud infrastructure system 302 are shared by several organizations in a related community. The cloud services may also be provided under a hybrid cloud model, which is a combination of two or more different models.

In some instances, the services provided by cloud infrastructure system 402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 302. Cloud infrastructure system 302 then performs processing to provide the services in the customer's subscription order.

In some instances, the services provided by cloud infrastructure system 302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Various different SaaS services may be provided. Examples include, without limitation, services that provide solutions for sales performance management, enterprise integration, and business flexibility for large organizations.

In some instances, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some instances, platform services provided by the cloud infrastructure system may include database cloud services, middleware cloud services (e.g., Oracle Fusion Middleware services), and Java cloud services. For instance, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

Cloud infrastructure system 302 may also include infrastructure resources 330 for providing the resources used to provide various services to customers of the cloud infrastructure system. Infrastructure resources 330 may include pre-integrated and optimized combinations of hardware, such as servers, storage, and networking resources to execute the services provided by the PaaS platform and the SaaS platform.

In some instances, resources in cloud infrastructure system 302 may be shared by multiple users and dynamically re-allocated per demand. Additionally, resources may be allocated to users in different time zones. For example, cloud infrastructure system 330 may enable a first set of users in a first time zone to utilize resources of the cloud infrastructure system for a specified number of hours and then enable the re-allocation of the same resources to another set of users located in a different time zone, thereby maximizing the utilization of resources.

A number of internal shared services 332 may be provided that are shared by different components or modules of cloud infrastructure system 302 and by the services provided by cloud infrastructure system 302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 302 may provide comprehensive management of cloud services (e.g., SaaS, PaaS, and IaaS services) in the cloud infrastructure system. Cloud management functionality may include capabilities for provisioning, managing and tracking a customer's subscription received by cloud infrastructure system 302, and the like.

For instance, as depicted in the FIG. 3, cloud management functionality may be provided by one or more modules, such as an order management module 320, an order orchestration module 322, an order provisioning module 324, an order management and monitoring module 326, and an identity management module 328. These modules may include or be provided using one or more computers and/or servers, which may be general purpose computers, specialized server computers, server farms, server clusters, or any other appropriate arrangement and/or combination.

In operation 334, a customer using a client device, such as client device 304, 306 or 308, may interact with cloud infrastructure system 302 by requesting one or more services provided by cloud infrastructure system 302 and placing an order for a subscription for one or more services offered by cloud infrastructure system 302. The customer may access a cloud User Interface (UI), cloud UI 312, cloud UI 314 and/or cloud UI 316 and place a subscription order via these UIs. The order information received by cloud infrastructure system 402 in response to the customer placing an order may include information identifying the customer and one or more services offered by the cloud infrastructure system 302 that the customer intends to subscribe to.

After an order has been placed by the customer, the order information can be received via the cloud UIs, 312, 314 and/or 316.

At operation 336, the order may be stored in order database 318. Order database 318 can be one of several databases operated by cloud infrastructure system 318 and operated in conjunction with other system elements.

At operation 338, the order information can be forwarded to an order management module 320. In some instances, order management module 320 may be configured to perform billing and accounting functions related to the order, such as verifying the order, and upon verification, booking the order.

At operation 340, information regarding the order can be communicated to an order orchestration module 322. Order orchestration module 322 may utilize the order information to orchestrate the provisioning of services and resources for the order placed by the customer. In some instances, order orchestration module 322 may orchestrate the provisioning of processing resources to support the subscribed services using the services of order provisioning module 324.

Order orchestration module 322 may enables the management of business processes associated with each order and applies logic to determine whether an order should proceed to provisioning. At operation 342, upon receiving an order for a new subscription, order orchestration module 322 may send a request to order provisioning module 324 to allocate processing resources and configure those processing resources needed to fulfill the subscription order. Order provisioning module 324 enables the allocation of processing resources for the services ordered by the customer. Order provisioning module 324 provides a level of abstraction between the cloud services provided by cloud infrastructure system 300 and the physical implementation layer that is used to provision the processing resources for providing the requested services. Order orchestration module 322 may thus be isolated from implementation details, such as whether or not services and processing resources are actually provisioned on the fly or pre-provisioned and only allocated/assigned upon request.

At operation 344, once the services and processing resources are provisioned, a notification of the provided service may be sent to customers on client devices 304, 306 and/or 308 by order provisioning module 324 of cloud infrastructure system 302.

At operation 346, the customer's subscription order may be managed and tracked by an order management and monitoring module 326. In some instances, order management and monitoring module 326 may be configured to collect usage statistics for the services in the subscription order, such as, but not limited to, the amount of storage used, the amount data transferred, the number of users, and the amount of system up time and system down time.

Cloud infrastructure system 300 may include an identity management module 328. Identity management module 328 may be configured to provide identity services, such as access management and authorization services in cloud infrastructure system 300. Identity management module 328 may control information about customers that request or utilize services provided by cloud infrastructure system 302. Such information can include information that authenticates the identities of such customers and information that describes which actions those customers are authorized to perform relative to various system resources (e.g., files, directories, applications, communication ports, memory segments, etc.). Identity management module 328 may also include the management of descriptive information about each client device and about how and by whom that descriptive information can be accessed and modified.

Figure 4:
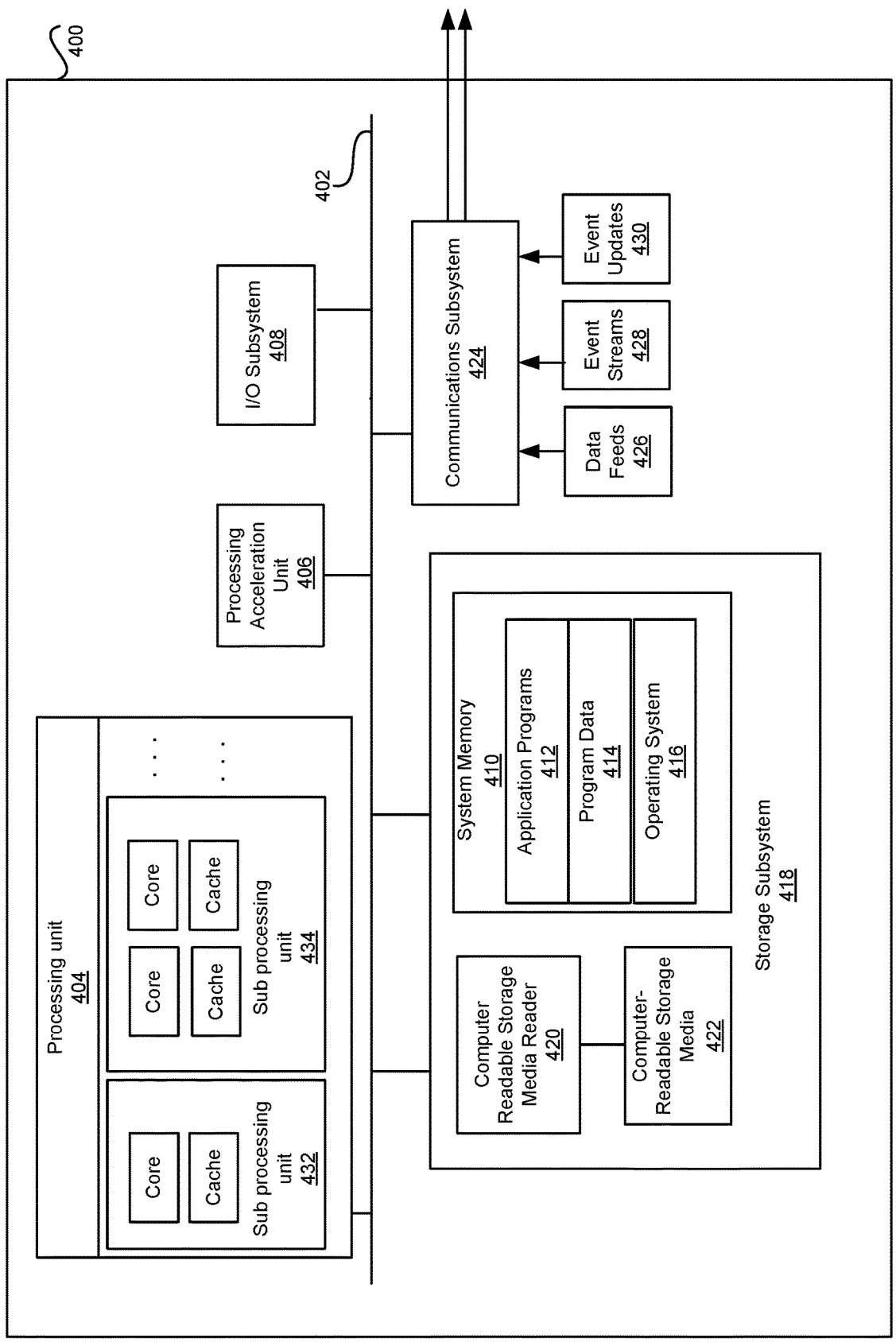
FIG. 4 illustrates an exemplary computer system according to at least one aspect of the disclosure.

FIG. 4 illustrates an exemplary computer system according to at least one aspect of the disclosure. The system 400 may be used to implement any of the computer systems described above. Computer system 400 includes a processing unit 404 that communicates with a number of peripheral subsystems via a bus subsystem 402. These peripheral subsystems may include a processing acceleration unit 406, an I/O subsystem 408, a storage subsystem 418 and a communications subsystem 424. Storage subsystem 418 includes tangible computer-readable storage media 422 and a system memory 410.

Bus subsystem 402 provides a mechanism for letting the various components and subsystems of computer system 400 communicate with each other as intended. Although bus subsystem 402 is shown schematically as a single bus, bus subsystem may utilize multiple buses. Bus subsystem 402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 404, which can be implemented as one or more integrated circuits (e.g., a conventional microprocessor or microcontroller), controls the operation of computer system 400. One or more processors may be included in processing unit 404. These processors may include single core or multicore processors. Processing unit 404 may be implemented as one or more independent processing units 432 and/or 434 with single or multicore processors included in each processing unit. In other instances, processing unit 404 may also be implemented as a quad-core processing unit formed by integrating two dual-core processors into a single chip.

Processing unit 404 can execute a variety of instruction sets (e.g., such as compiled or interpreted program code. or the like) corresponding to one or more programs. Processing unit 404 can maintain multiple concurrently executing programs or processes, using for example, one or more cores concurrently or one or more sub-processing units 434. At any given time, some or all of the instruction sets to be executed can be resident in processor(s) 404, such as in a cache level and/or in storage subsystem 418. Through suitable programming, processor(s) 404 can provide various functionalities described above. Computer system 400 may additionally include a processing acceleration unit 406, which can include a digital signal processor (DSP), a special-purpose processor, and/or the like.

I/O subsystem 408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Additionally, user interface input devices may include voice recognition sensing devices that enable users to interact with voice recognition systems (e.g., Siri® navigator), through voice commands.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 400 may comprise a storage subsystem 418 that comprises software elements, shown as being currently located within a system memory 410. System memory 410 may store program instructions that are loadable and executable on processing unit 404, as well as data generated during the execution of these programs.

Depending on the configuration and type of computer system 400, system memory 410 may be volatile (such as random access memory (RAM)) and/or non-volatile (such as read-only memory (ROM), flash memory, etc.). The RAM may include data and/or program modules that are immediately accessible to and/or presently being operated and executed by processing unit 404. In some instances, system memory 410 may include multiple different types of memory, such as static random access memory (SRAM) or dynamic random access memory (DRAM). In some instances, a basic input/output system (BIOS), containing the basic routines that help to transfer information between elements within computer system 400, such as during start-up, may be stored in the ROM. By way of example, and not limitation, system memory 410 also illustrates application programs 412, which may include client applications, Web browsers, mid-tier applications, relational database management systems (RDBMS), etc., program data 414, and an operating system 416. By way of example, operating system 416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 418 may also provide a tangible computer-readable storage medium for storing the basic programming and data constructs that provide the functionality described herein. Software (programs, code modules, instructions) that when executed by a processor provide the functionality described above may be stored in storage subsystem 418. These software modules or instructions may be executed by processing unit 404. Storage subsystem 418 may also provide a repository for storing data used in accordance with the present invention.

Storage subsystem 400 may also include a computer-readable storage media reader 420 that can further be connected to computer-readable storage media 422. Together and, optionally, in combination with system memory 410, computer-readable storage media 422 may comprehensively represent remote, local, fixed, and/or removable storage devices plus storage media for temporarily and/or more permanently containing, storing, transmitting, and retrieving computer-readable information.

Computer-readable storage media 422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 400.

By way of example, computer-readable storage media 422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 422 may include, but is not limited to, Zip® drives, flash memory cards, universal serial bus (USB) flash drives, secure digital (SD) cards, DVD disks, digital video tape, and the like. Computer-readable storage media 422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 400.

Communications subsystem 424 provides an interface to other computer systems and networks. Communications subsystem 424 serves as an interface for receiving data from and transmitting data to other systems from computer system 400. For example, communications subsystem 924 may enable computer system 400 to connect to one or more devices via the Internet. In some instances, communications subsystem 424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some instances, communications subsystem 424 can provide wired network connectivity (e.g., Ethernet) in addition to or instead of a wireless interface.

In some instances, communications subsystem 424 may also receive input communication in the form of structured and/or unstructured data feeds 426, event streams 428, event updates 430, and the like on behalf of one or more users who may use computer system 400.

By way of example, communications subsystem 424 may be configured to receive data feeds 426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 424 may also be configured to receive data in the form of continuous data streams, which may include event streams 428 of real-time events and/or event updates 430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 424 may also be configured to output the structured and/or unstructured data feeds 426, event streams 428, event updates 430, and the like to one or more databases that may be in communication with one or more streaming data source computers coupled to computer system 400.

Computer system 400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 400 depicted in the figure is intended only as a specific example. Computer system 400 may include other configurations that may have more or fewer components. For example, customized hardware might also be used and/or particular elements might be implemented in hardware, firmware, software (including applets), or a combination. For instance, the applications, programs, and/or services described above may be provided by one or more application specific integrated circuits (ASIC), field programmable gate arrays, masc programmable gate arrays, combinations thereof, and the like. Computer system 400 may be connected to one or more other network computing devices, such as network input/output devices. Based on the disclosure and teachings provided herein, a person of ordinary skill in the art will appreciate other ways and/or methods to implement the various aspects of the present disclosure.

Figure 5:
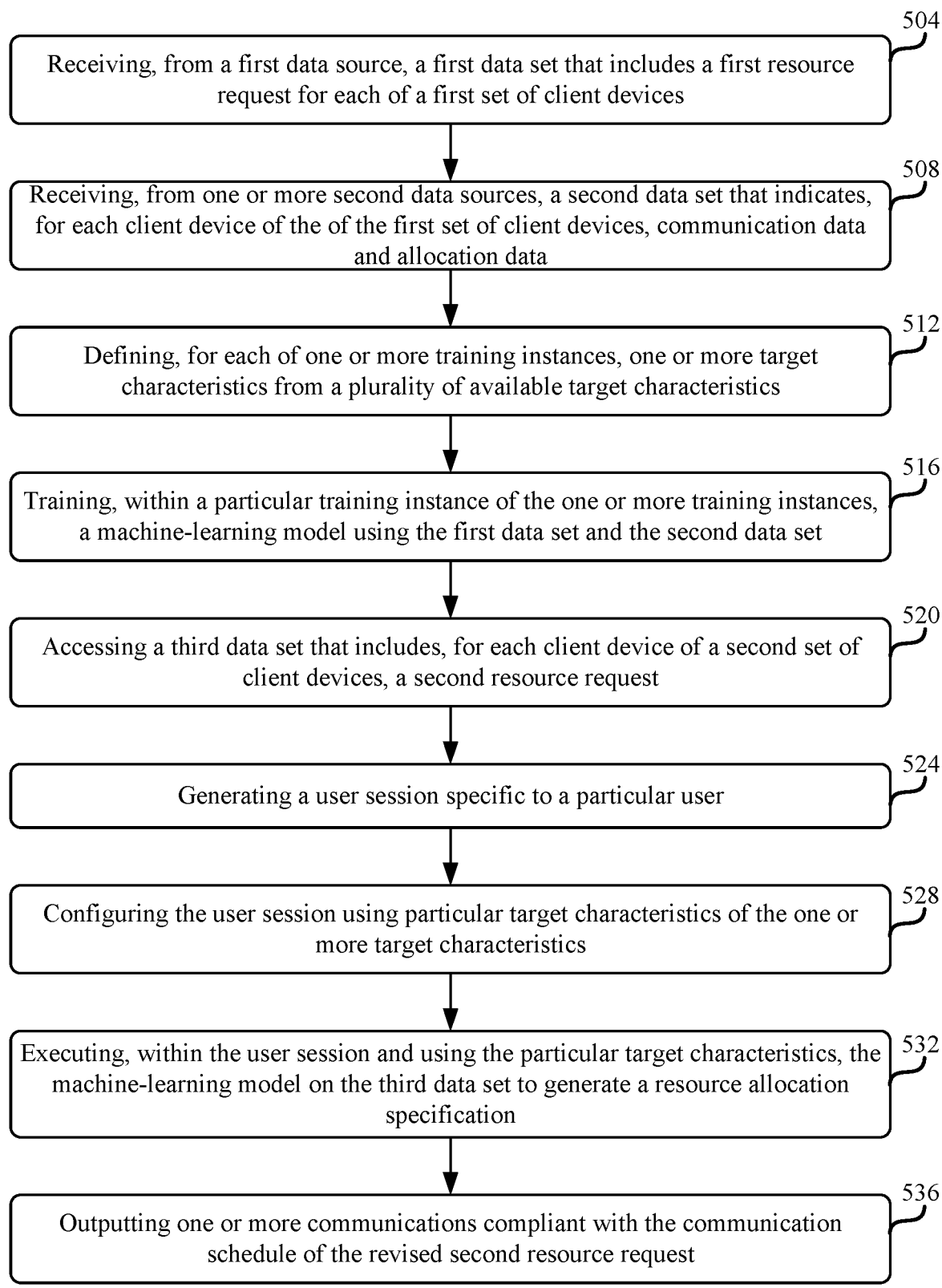
FIG. 5 is a block diagram of various processing views of a divergent case during operation of semantic tagging according to at least one aspect of the disclosure.

FIG. 5 illustrates a flowchart of an example process for machine-learning processing at native-location storage system to generate collections action plan according to at least one aspect of the disclosure. At block 504, a first data set may be received from a first data source at a computing device. The first data source may include one or more client computing devices such as those described in connection with FIG. 2. In some instances, the first data source may include one or more users operating one or more of the one or more client computing device. The first data source may be positioned within the computing device, near the computing device connected via a wired or wireless network connection, or remote from the computing device. The first data may include a resource request from each of a set of entities. The resource request may include a timestamp corresponding to the generation of the resource request or the provisioning of a service or product for which the resource request was generated. The resource request may also include a resource manifest that indicates an amount resource to be allocated.

At block 508, a second data set may be received from one or more second data sources. The second data set may include data that corresponds to the first set of entities. For instance, the second data may include, for each entity, communications data that characterizes one or more communications transmitted to the entity. The communications maybe associated with an allocation of corresponding resource request. The communication data may include a communication type (e.g., initial communication, follow-up communication, a resource request communication, or the like), a communication protocol (e.g., email, SMS messaging, mail, phone, instant messaging, combinations thereof, or the like), a timestamp, and content (e.g., whether a reduction was authorized, reduction amount, whether an installment plan was authorized, type of installment plan (e.g., duration, reoccurring payment amount, or the like), contents of the resource request (e.g., date of provisioning occurred, date resource request was generated or transmitted, amount of resources requested, combinations thereof, or the like), combinations thereof, or the like.

The second data set may include, for each entity, allocation data that indicates whether the resource request was satisfied by the entity and the resource allocated. In some instances, the amount of resource allocated may be equal to the resources requested. In other instances, entities may allocate only a portion of the resource requested. The allocation data may indicate what portion of the resources requested by the resource request were ultimately allocated by the entity.

At block 512, one or more target characteristics may be defined for a training instances. In some instances, multiple training instances may be defined. In those instances, one or more target characteristics maybe defined for each training instance such that the one or more target characteristics of one training instance may be different from the one or more target characteristics of another training instance. In some instances, the target characteristics of one training instances may include some overlapping target characteristics with another of another training instance. The target characteristics may correspond to characteristics that are processed by a machine-learning model. For instance, the target characteristics may include characteristics derived from the first data set or the second data set. In some instances, the target characteristics may be selected by a user. In other instances, the target characteristics may be automatically selected.

At block 516, a machine-learning model may be trained within one of the training instances. Training the machine-learning model may use the first data set and the second data set as input in the machine-learning model with the target characteristics as expected output (e.g., supervised learning). In some instances, machine-learning model may be trained within a central server or a database that stores the first data set and the second data set. In other instances, the machine-learning may be trained by one or more user devices. The machine-learning model may use one or more algorithms to extrapolate relationships between the input data to derive the expected output. The machine-learning model may learn a set of parameters as a result of the training, The set of parameters may be utilized by the machine-learning model to process future input to derive one or more characteristics of a same type as the target characteristics. For instance, the set of parameters may include weights assigned to input data such that data that contributes to deriving the output may be weighted higher that data that may not contribute to deriving the output.

The machine-learning model may use one or more algorithms such as, but not limited to naive bayes, decision trees, support vector machine, or the like. Naive bayes is a classifier that assigns a classification tag to an input data set. Naive bayes may apply a strong assumption regarding the independence of features. For instance, the value if each feature is independent of the value of other features.

Decision trees are finite classifiers may be represented by a branching tree structure. The tree begins with a single root node that branches (based on a decision) to one or more child nodes. Each child node may branch to zero or more grandchild nodes (and so on). The classification occurs at leaf nodes (nodes that do not branch to any subsequent node). Traversing a decision tree may include resolving the logic of each node based on the input data to determine which node to resolve next. For instance, a node may include the logical statement "the object is blue" and branch to two nodes, a first node if the statement is true, and a second node if the statement is false. The subsequent node may include a different logical statement that may further narrow the classification of the input data. The logical statements may be true or false, resolve to a numerical value, or resolve to any value that can be indicative of the subsequent node in a traversal (i.e., which node should resolve next in the classification).

Support vector machine represents each set of input data as a point in space that can be separated based an association with a label (e.g., expected classification). Input data that correspond to a first label may be separated by input data corresponding to a second label. Support vector machine may define the gap between the input data of the first label and the input data of the second label such that future data sets may be classified based on which side of the gap the future data appears. In some instances, support vector machine performs linear classification. In other instance, support vector machine performs non-linear classification through implicit mapping of linear inputs to higher-dimensional features.

The machine-learning mode may be trained using one or more algorithm per training instance. In some instance, in order to determine which algorithm may be best suited for a given input data, the machine-learning model may be trained using each algorithm. For instance, the machine-learning model may be trained using a first algorithm and one or more data sets may be passed as input. The one or more data sets may include an expected output label. The output of the machine-learning model may be compared to the expected output label to derive an accuracy of the machine-learning model. The machine-learning model may then be reset (or a new machine-learning model may be provisioned), which can be trained using a different algorithm. Accuracy values may be derived for the machine-learning model trained for each algorithm to determine which machine-learning model and algorithm pairing generated the highest accuracy output. The machine-learning model with the highest accuracy may be used to process other data sets.

At block 520, a third data set may be accessed. The third data set may include a resource request (e.g., a timestamp and resource manifest) for each entity of a second set of entities. In some instances, the second set of entities may be entirely distinct from the first set of entities. In other instances, the second set of entities may include one or more entities that may also be included in the first set of entities.

Examples, of the data within the third data set include, but is not limited to: a current quantity of resources requested; past resource request/allocation performance (e.g., rate in which client device authorized allocation of resources after receiving one or more resource requests, one or more dates on which resource allocation was authorized, one or more days of the week on which resource allocation was authorized, one or more times of day on which resource allocation was authorized, whether the client device (e.g., a customer, user operated desktop or laptop device, mobile device, combinations thereof, or the like) responded to one or more resource request, an extent to which authorized resource allocation(s) corresponded to one or more resource request amounts, whether one or more past resource allocations were part of a resource allocation installment plan, a location where the resource allocation was made, mode of resource allocation); past resource request characteristics (e.g., one or more dates on which an resource request was sent, one or more days of the week on which an resource request was sent, one or more times at which an resource request was sent, one or more relative time periods between a date on which an resource request was sent and a date on which a product or service was provisioned, an amount requested by the resource request, any percentage or absolute reduction applied in the resource request, a communication channel by which the resource request was communicated, and/or whether a resource request installment plan was offered in the resource request, characteristics (e.g., term, any interest rate) of any installment plan offered in an resource request, Examples of the data may also include whether a reduction incentive or other incentive was provided for authorizing resource allocation in response to the resource request within a defined time period, whether a penalty was provided for not having authorized resource allocation in response to the resource request within a defined time period, etc.); follow-up characteristics (whether, when, and/or via what communication channel a follow-up on an resource request was transmitted and/or frequency of transmitting a follow-up, etc.); product/service characteristics (e.g., an identifier of one or more products or services ordered by the client device, a quantity of one or more products or services ordered by the client device, a total or per-item price of one or more products or services ordered by the client device, a date on which one or more orders were placed, a date on which one or more products or services were provided to the client device, etc.); account information (e.g., indicating a current amount of resources requested, a cumulative amount of resources allocated within a time, a size of an entity (e.g., client device, corporation, server system, cloud system, or the like), an industry of the client device, a location of an entity, identifiers of one or more contacts for the client device, etc.); and/or client device information (e.g., indicating a bankruptcy filing, a tax lien, a legal proceeding, a foreclosure, risk score).

At block 524, a user session can be generated. The user session may be specific to a particular user.

At block 528, the user session can be configured using particular target characteristics. In some instances, the particular target characteristics may be selected from one or more target characteristics such as those target characteristics that are not selected may be omitted from subsequent processing within the trained machine-learning model. In other instances, selected target characteristics may be weighted higher than non-selected target characteristics (though the non-selected target characteristics may remain in subsequent processing within the trained machine-learning model). In some instances, a user of a client computing device may select the target characteristics.

At block 532, the machine-learning model may be executed within the user session and using the particular target characteristics. The machine-learning model may be executed on the third data set to generate a resource-allocation specification that includes, for each of at least one of the second set of entities, a revised second resource request. The revised second resource request may include a communication schedule and a third resource manifest, the third resource manifest being different from the second resource manifest. The revised second resource request may also include one or more communication protocols over which to transmit communications to the second entity, a timestamp corresponding to the when the revised resource request was generated, etc. For instance, the communication schedule may indicate one or more communications of a particular type to transmit to an entity at a particular time, over a particular time interval, at reoccurring time intervals, or the like. The one or more communications can be transmitted over at least one of the one or more communication protocols. The one or more communications may include an offer for a reduction, an offer of an installment plan, a revised resource allocation timeline, or the like. The third resource manifest may indicate a lessor amount of resources requested than the amount of resource requested in the second resource manifest.

For example, the revised second resource request can include: a recommended collection strategy can indicate (for example) a date of the month on which to transmit an resource request, a day of the week on which to transmit a resource request, a time at which to transmit an resource request, a communication channel to use to transmit an resource request (e.g., via email, mail, phone or web portal), a date of the month on which to transmit a follow-up on an resource request, a day of the week on which to transmit a follow-up on an resource request, a date of the month on which the resource request indicates that resource allocation is due, a day of the week on which the resource request indicates that resource allocation is due, a time period between a date on which an resource request is transmitted and a date on which the resource request indicates that resource allocation is due, a communication protocol to use to transmit a follow-up on an resource request (e.g., via email, mail, phone or web portal), whether to transmit a follow-up on an resource request, a time period that indicates after how long a follow-up on an resource request is to be transmitted, a day of the week on which a follow-up is to be transmitted, a time of day at which a follow-up is to be transmitted, and/or frequency at which follow-ups on an resource request are to be transmitted.

For example, the revised second resource request can also include: whether to apply a general or conditioned reduction (e.g., where a conditioned reduction (e.g., discount) indicates that the reduction will be applied if resource allocation is received by a given date), whether to indicate that a conditioned penalty will be applied (e.g., that indicates that an amount due will increase by a specified amount if resource allocation is not received by a given date or that a client device will be black-listed and restricted from making subsequent orders if resource allocation is not received by a given date), which of multiple contacts associated with a client device to contact, whether to offer a resource allocation installment plan; and/or one or more characteristics of an installment plan to offer.

High-level recommended collection strategies can include similar types of strategies that are to be applied to some or all client devices represented in an input. Another type of high-level recommended resource-allocation specification may include (for example) changing a number of collectors (e.g., employees) that are tasked with communicating with select or all client devices or second entities (e.g., to communicate an resource request and/or follow-up on an resource request).

In some instances, the machine-learning model may be executed in-database at the same database that stores the third data set. For instance, the third data set may be stored at a first lower level of a database, and the machine-learning model may be executed at a native location at a second higher layer of the database.

In some instances, the resource-allocation specification generated by the machine-learning model can include properties such as, for example: a time range (e.g., hours, days, months, years, or the like) that indicates the time interval between generating or transmitting a resource request and the occurrence of the resource allocation. The output of the machine-learning model may include a classification of the likelihood that a resource request will be satisfied (e.g., between 1 and 5, a percentage, a fraction, or the like). In these instances, the time range and the classification of the likelihood that a resource request will be satisfied may be used to generate the resource-allocation specification.

In some instances, the properties may also include: the weights assigned by the machine-learning model to each target characteristics. As input is passed to the machine-learning model the weights may change reflect the relative importance each target characteristics may have on the overall output. This may be used to refine the target characteristics used in process data with the machine-learning model. For instance, if a particular target characteristic has little impact on the output of the machine-learning model than the target characteristic may be weighted lower than other target characteristics or removed from the user session. In some instance, removal or down-weighting a particular target characteristic may necessitate another target characteristic be selected to replace the particular target characteristic. In some instances, a user may be prompted to select (or optionally not select) additional target characteristics.

The output of the machine-learning model may be used to refine the target characteristics as used in resource requests. For instance, if a particular user that issued the resource request corresponds to a machine-learning model output with a smaller average time range and/or a higher likelihood that the entity will satisfy the resource request than another user. The output may recommend future resource request for the particular entity be issued from the particular user.

In some instances, the machine-learning model can generate output that separates the set of entities into three clusters, where resource-allocation specifications generated by the machine-learning model for each entity of the first cluster may include one or more first properties common to each entity in the first cluster; where resource-allocation specifications generated by the machine-learning model for each entity of the second cluster may include one or more second properties common to each entity in the second cluster; and where source-allocation specifications generated by the machine-learning model for each entity of the third cluster may include one or more third properties common to each entity in the third cluster. Each cluster may be further divided to indicate whether a reduction in the resources requested may be included provided the resource allocation is received by an identified interval (and/or that indicates a size of such reduction). The one or more properties can include any of the properties described above. In some instances, a cluster can include resource-allocation specifications that indicate to not send additional resource allocation requests to the entities of the cluster. Though three clusters are described above, any number of clusters or sub-clusters may be defined with the machine-learning model generating resource-allocation requests with at least one property.

At block 536, the one or more communications compliant with the communication schedule of the revised second resource request may be output to the at least one of the second set of entities.

The blocks of FIG. 5 may be executed in the particular order depicted or in any other particular order. In addition, each block may be executed once or multiple times within a single execution of the process of FIG. 5.

Specific details are given in the above description to provide a thorough understanding of the embodiments. However, it is understood that the embodiments may be practiced without these specific details. For example, circuits may be shown in block diagrams in order not to obscure the embodiments in unnecessary detail.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
receiving, from a first data source, a first data set that includes a first resource request for each of a first set of entities, each first resource request including a first timestamp and a first resource manifest that indicates an amount of resources to be allocated;
receiving, from one or more second data sources, a second data set that indicates, for each entity of the of the first set of entities:
communications data that characterizes one or more communications transmitted to the entity, each communication of the one or more communications being associated with an allocation of resources corresponding to a resource request, wherein the communications data includes, for each communication of the one or more communications:
a communication type;
a communication protocol used to transmit the communication;
a timestamp; and
content of the communication; and
allocation data that indicates whether the resource request was satisfied by the entity and an amount of resources allocated if the resource request was satisfied;
defining, for each of one or more training instances, one or more target characteristics from a plurality of available target characteristics, wherein the one or more target characteristics for a particular training instance are different than target characteristics of other training instances;
training, within a particular training instance of the one or more training instances, a machine-learning model using the first data set and the second data set;
accessing a third data set that includes, for each entity of a second set of entities, a second resource request, each second resource request including a second timestamp and a second resource manifest;
generating a user session specific to a particular user;
configuring the user session using particular target characteristics of the one or more target characteristics, the particular target characteristics being associated with the user session;
executing, within the user session and using the particular target characteristics, the machine-learning model on the third data set to generate a resource-allocation specification that includes, for each of at least one of the second set of entities, a modified second resource request that includes a communication schedule and a third resource manifest, the third resource manifest being different from the second resource manifest; and
outputting one or more communications compliant with the communication schedule of the modified second resource request.

2. The method of claim 1, wherein the third data set is stored at a first lower level of a database, and wherein the machine-learning model is executed at a native location at a second higher layer of the database.

3. The method of claim 1, wherein at least one communication of the one or more communications includes the modified second resource request or a follow-up communication to a previous communication, wherein the follow-up communication is generated in a manner that is not conditioned upon and is not triggered by receipt of user input.

4. The method of claim 1, further comprising:
receiving, from end user device, an identification of the one or more target characteristics for the machine-learning model.

5. The method of claim 1, further comprising:
receiving, from an end user device, an indication as to one or more allocation communication actions that are to be automatically performed; and
determining at least one allocation communication action of the one or more allocation communication actions that corresponds to the resource-allocation specification; and
automatically executing the allocation communication action in response to determining at least one allocation communication action of the one or more allocation communication actions that corresponds to the resource-allocation specification.

6. The method of claim 1, wherein the third data set associates each of the second set of entities with a cluster of a set of clusters, and wherein each cluster of the set of clusters is associated with one or more cluster-corresponding resource-allocation specifications.

7. The method of claim 1, further comprising, prior to outputting the one or more communications:
outputting one or more first outputs to facilitate presenting an interface at an end-user device, wherein the interface includes representation of at least part of the third data set and includes at least one input component that, when selected, triggers automatic generation of one or more communications based on at least part of the third data set; and
detecting selection of the at least one input component, wherein the one or more communications are output in response to the detection.

8. A system comprising:
one or more processors;
a non-transitory computer-readable medium including instructions that when executed by the one or more processors, causes the one or more processors to perform operations including:
receiving, from a first data source, a first data set that includes a first resource request for each of a first set of entities, each first resource request including a first timestamp and a first resource manifest that indicates an amount of resources to be allocated;
receiving, from one or more second data sources, a second data set that indicates, for each entity of the of the first set of entities:
communications data that characterizes one or more communications transmitted to the entity, each communication of the one or more communications being associated with an allocation of resources corresponding to a resource request, wherein the communications data includes, for each communication of the one or more communications:
a communication type;
a communication protocol used to transmit the communication;
a timestamp; and
content of the communication; and
allocation data that indicates whether the resource request was satisfied by the entity and an amount of resources allocated if the resource request was satisfied;
defining, for each of one or more training instances, one or more target characteristics from a plurality of available target characteristics, wherein the one or more target characteristics for a particular training instance are different than target characteristics of other training instances;
training, within a particular training instance of the one or more training instances, a machine-learning model using the first data set and the second data set, wherein a set of parameters are learned as a result of the training;
accessing a third data set that includes, for each entity of a second set of entities, a second resource request, each second resource request including a second timestamp and a second resource manifest;
generating a user session specific to a particular user;
configuring the user session using particular target characteristics of the one or more target characteristics;
executing, within the user session and using the particular target characteristics, the machine-learning model on the third data set to generate a resource-allocation specification that includes, for each of at least one of the second set of entities, a modified second resource request that includes a communication schedule and a third resource manifest, the third resource manifest being different from the second resource manifest; and
outputting one or more communications compliant with the communication schedule of the modified second resource request.

9. The system of claim 8, wherein the third data set is stored at a first lower level of a database, and wherein the machine-learning model is executed at a native location at a second higher layer of the database.

10. The system of claim 8, wherein at least one communication of the one or more communications includes the modified second resource request or a follow-up communication to a previous communication, wherein the follow-up communication is generated in a manner that is not conditioned upon and is not triggered by receipt of user input.

11. The system of claim 8, wherein the operations further include: receiving, from end user device, an identification of the one or more target characteristics for the machine-learning model.

12. The system of claim 8, wherein the operations further include:
receiving, from an end user device, an indication as to one or more allocation communication actions that are to be automatically performed; and
determining at least one allocation communication action of the one or more allocation communication actions that corresponds to the resource-allocation specification; and
automatically executing the allocation communication action in response to determining at least one allocation communication action of the one or more allocation communication actions that corresponds to the resource-allocation specification.

13. The system of claim 8, wherein the third data set associates each of the second set of entities with a cluster of a set of clusters, and wherein each cluster of the set of clusters is associated with one or more cluster-corresponding resource-allocation specifications.

14. The system of claim 8, wherein the operations further include:
prior to outputting the one or more communications:
outputting one or more first outputs to facilitate presenting an interface at an end-user device, wherein the interface includes representation of at least part of the third data set and includes at least one input component that, when selected, triggers automatic generation of one or more communications based on at least part of the third data set; and detecting selection of the at least one input component, wherein the one or more communications are output in response to the detection.

15. A non-transitory computer-readable medium including instructions that when executed by one or more processors, causes the one or more processors to perform operations including:

receiving, from a first data source, a first data set that includes a first resource request for each of a first set of entities, each first resource request including a first timestamp and a first resource manifest that indicates an amount of resources to be allocated;

receiving, from one or more second data sources, a second data set that indicates, for each entity of the of the first set of entities:

communications data that characterizes one or more communications transmitted to the entity, each communication of the one or more communications being associated with an allocation of resources corresponding to a resource request, wherein the communications data includes, for each communication of the one or more communications:

a communication type;

a communication protocol used to transmit the communication;

a timestamp; and content of the communication; and allocation data that indicates whether the resource request was satisfied by the entity and an amount of resources allocated if the resource request was satisfied;

defining, for each of one or more training instances, one or more target characteristics from a plurality of available target characteristics, wherein the one or more target characteristics for a particular training instance are different than target characteristics of other training instances;

training, within a particular training instance of the one or more training instances, a machine-learning model using the first data set and the second data set, wherein a set of parameters are learned as a result of the training;

accessing a third data set that includes, for each entity of a second set of entities, a second resource request, each second resource request including a second timestamp and a second resource manifest;

generating a user session specific to a particular user;

configuring the user session using particular target characteristics of the one or more target characteristics;

executing, within the user session and using the particular target characteristics, the machine-learning model on the third data set to generate a resource-allocation specification that includes, for each of at least one of the second set of entities, a modified second resource request that includes a communication schedule and a third resource manifest, the third resource manifest being different from the second resource manifest; and outputting one or more communications compliant with the communication schedule of the modified second resource request.

16. The non-transitory computer-readable medium of claim 15, wherein the third data set is stored at a first lower level of a database, and wherein the machine-learning model is executed at a native location at a second higher layer of the database.

17. The non-transitory computer-readable medium of claim 15, wherein at least one communication of the one or more communications includes the modified second resource request or a follow-up communication to a previous communication, wherein the follow-up communication is generated in a manner that is not conditioned upon and is not triggered by receipt of user input.

18. The non-transitory computer-readable medium of claim 15 wherein the operations further include:

receiving, from end user device, an identification of the one or more target characteristics for the machine-learning model.

19. The non-transitory computer-readable medium of claim 15, wherein the operations further include:

receiving, from an end user device, an indication as to one or more allocation communication actions that are to be automatically performed; and determining at least one allocation communication action of the one or more allocation communication actions that corresponds to the resource-allocation specification; and automatically executing the allocation communication action in response to determining at least one allocation communication action of the one or more allocation communication actions that corresponds to the resource-allocation specification.

20. The non-transitory computer-readable medium of claim 15, wherein the third data set associates each of the second set of entities with a cluster of a set of clusters, and wherein each cluster of the set of clusters is associated with one or more cluster-corresponding resource-allocation specifications.

* * * * *

UNITED STATES PATENT AND TRADEMARK OFFICE
CERTIFICATE OF CORRECTION

PATENT NO.        : 10,904,298 B2            Page 1 of 1
APPLICATION NO.   : 16/586365
DATED             : January 26, 2021
INVENTOR(S)       : Sondhi et al.

It is certified that error appears in the above-identified patent and that said Letters Patent is hereby corrected as shown below:

In the Specification

In Column 1, Line 51, delete "of the of the" and insert -- of the --, therefor.

In Column 3, Line 41, delete "the an" and insert -- an --, therefor.

In Column 6, Line 42, delete "Oracle®" and insert -- Oracle®, --, therefor.

In Column 8, Line 64, delete "that that" and insert -- that --, therefor.

In Column 19, Line 11, delete "masc" and insert -- mask --, therefor.

In Column 20, Line 30, delete "The" and insert -- the --, therefor.

In Column 21, Line 62, delete "request," and insert -- request. --, therefor.

In the Claims

In Column 26, Line 4, in Claim 1, delete "of the of the" and insert -- of the --, therefor.

In Column 27, Lines 43-44, in Claim 8, delete "of the of the" and insert -- of the --, therefor.

In Column 29, Line 18, in Claim 15, delete "of the of the" and insert -- of the --, therefor.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*